US012683651B2

(12) United States Patent (10) Patent No.: US 12,683,651 B2
Sahraei et al. (45) Date of Patent: Jul. 14, 2026

(54) PASSIVE DEVICE INFORMATION

(71) Applicant: QUALCOMM Incorporated, San Diego, CA (US)

(72) Inventors: Saeid Sahraei, San Diego, CA (US); Ahmed Elshafie, San Diego, CA (US); Hung Dinh Ly, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/553,457

(22) PCT Filed: Jun. 10, 2021

(86) PCT No.: PCT/CN2021/099348
§ 371 (c)(1),
(2) Date: Sep. 29, 2023

(87) PCT Pub. No.: WO2022/257070
PCT Pub. Date: Dec. 15, 2022

(65) Prior Publication Data
US 2024/0187040 A1 Jun. 6, 2024

(51) Int. Cl.
*H04B 7/04* (2017.01)
*H04L 5/00* (2006.01)
*H04L 25/02* (2006.01)

(52) U.S. Cl.
CPC ......... *H04B 7/04013* (2023.05); *H04L 5/005* (2013.01); *H04L 25/0224* (2013.01)

(58) Field of Classification Search
CPC .. H04B 7/04013; H04L 5/005; H04L 25/0224
See application file for complete search history.

(56) References Cited

U.S. PATENT DOCUMENTS

2009/0257530 A1* 10/2009 Shim ................. H04L 25/03197
375/340
2021/0302561 A1* 9/2021 Bayesteh ................ G01S 13/42
(Continued)

OTHER PUBLICATIONS

Alexandropoulos G.C., et al., "Phase Configuration Learning in Wireless Networks with Multiple Reconfigurable Intelligent Surfaces", arxiv.org, Cornell University Library, 201 Olin Library Cornell University Ithaca, NY 14853, Oct. 9, 2020 (Oct. 9, 2020), XP081782310, 6 Pages, the whole document.
(Continued)

*Primary Examiner* — Joseph A Bednash
(74) *Attorney, Agent, or Firm* — Harrity & Harrity, LLP

(57) ABSTRACT

Various aspects of the present disclosure generally relate to wireless communication. In some aspects, a first device (310) may receive multiple reference signals (RSs) from a second device (320) via a plurality of passive devices (410,420), where each RS of the multiple RSs is forwarded individually by one of the plurality of passive devices with a first set of reflection configurations (Slot 502, Slot 504). The first device may receive an additional RS from the second device via the plurality of passive devices, where the additional RS is forwarded jointly by all of the plurality of passive devices with a second set of reflection configurations (Slot 506). The first device may determine information from the plurality of passive devices based on the multiple RSs and the additional RS, where the information is represented by a change between the first set of reflection configurations and the second set of reflection configurations. Numerous other aspects are described.

29 Claims, 12 Drawing Sheets

(56)                    References Cited

U.S. PATENT DOCUMENTS

2023/0258759 A1*   8/2023   Wang ................ H04B 7/04026
                                              455/456.1
2024/0163840 A1*   5/2024   Säily ................. H04L 25/0222

OTHER PUBLICATIONS

International Search Report and Written Opinion—PCT/CN2021/099348—ISA/EPO—Dec. 10, 2021.
Ning N., et al., "Terahertz Multi-User Massive MIMO With Intelligent Reflecting Surface: Beam Training and Hybrid Beamforming", IEEE Transactions on Vehicular Technology, IEEE Service Center Piscataway, NJ, US, vol. 70, No. 2, Jan. 15, 2021 (Jan. 15, 2021), pp. 1376-1393, XP011841715, 18 Pages, ISSN: 0018-9545, DOI: 10.1109/TVT.2021.3052074, [Retrieved on Mar. 9, 2021] p. 1378-p. 1388 Section II-Section v figures 1-17, the whole document.

* cited by examiner

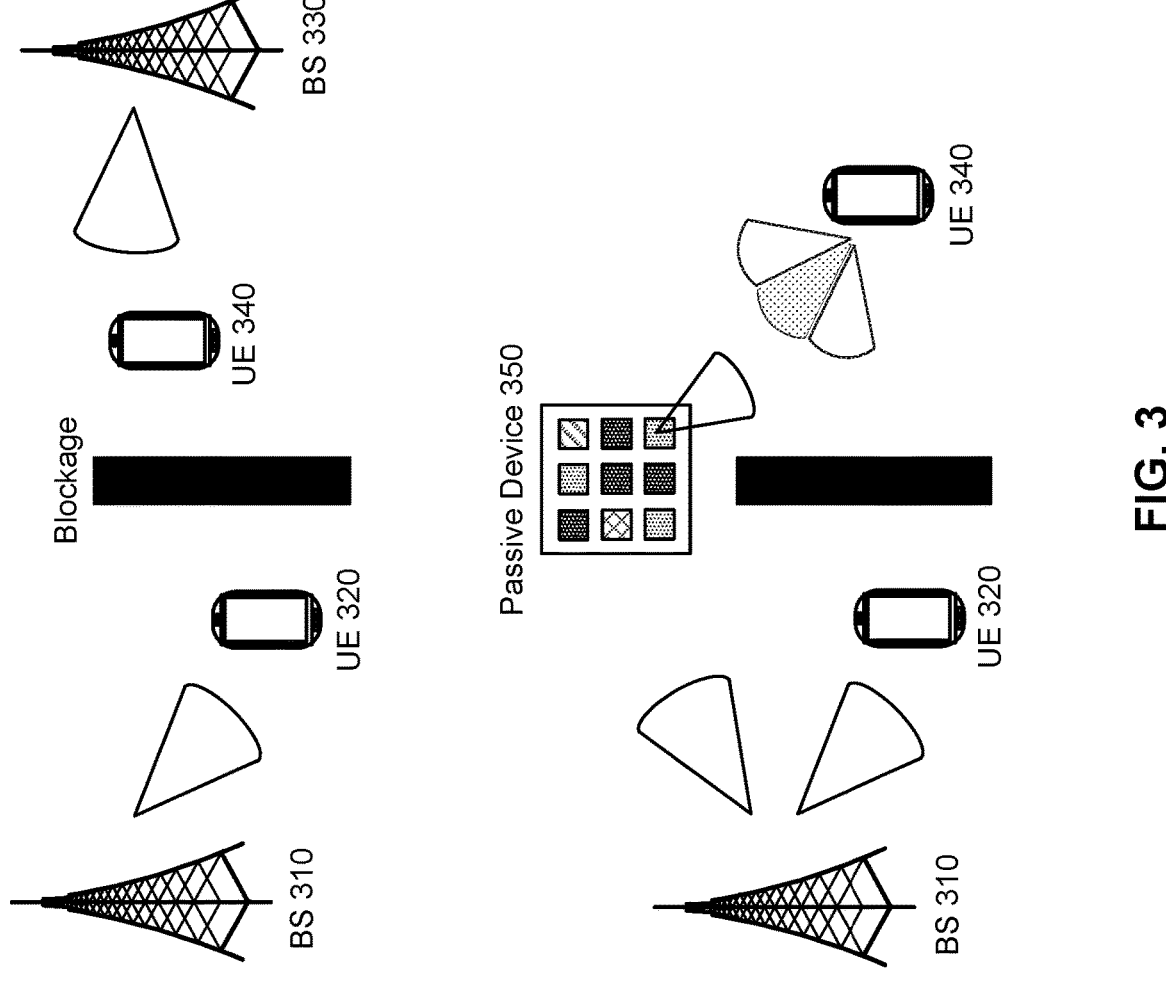
FIG. 3

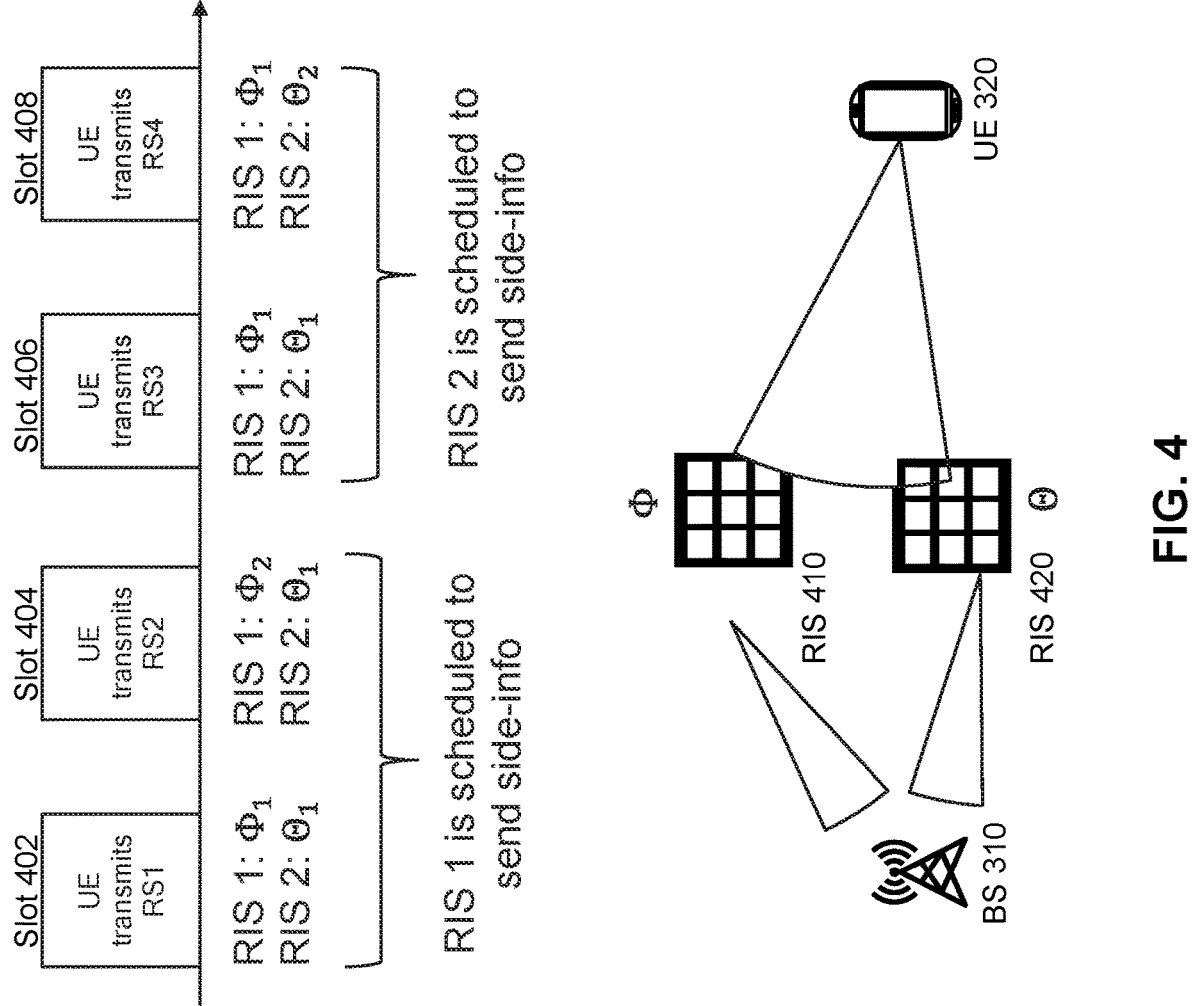
FIG. 4

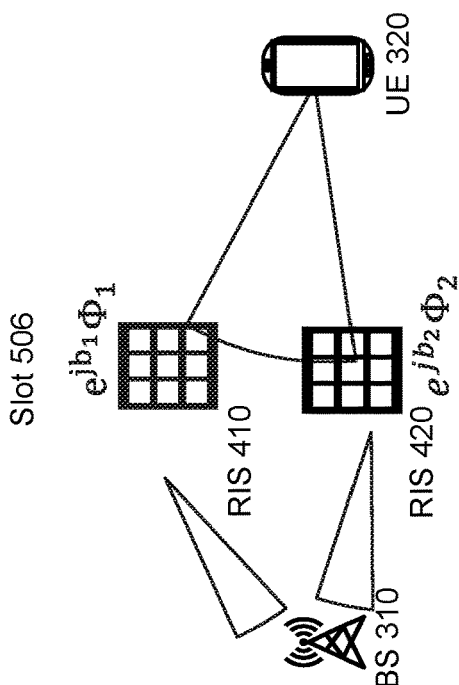
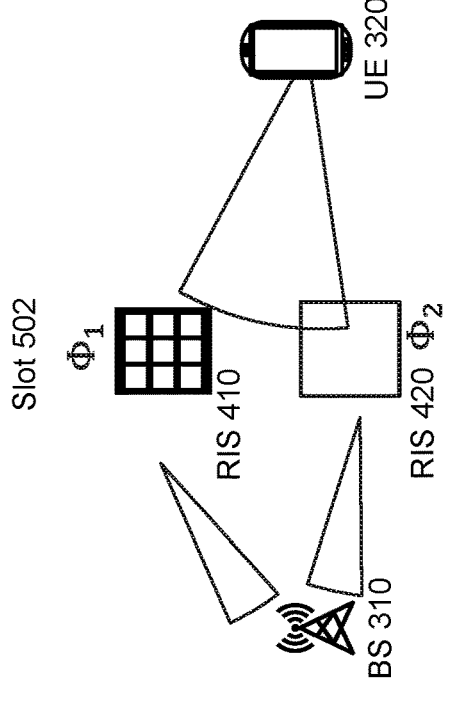
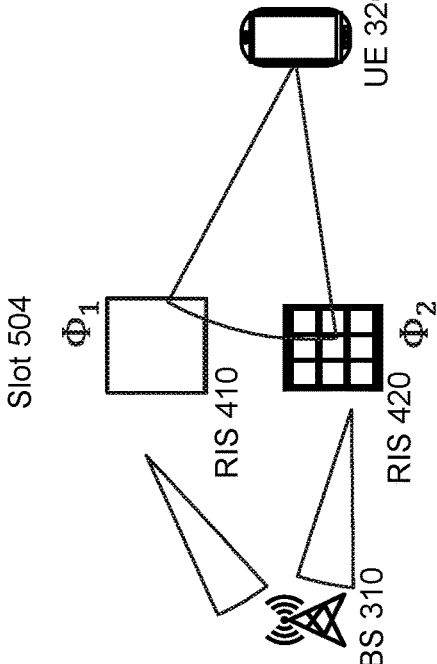
FIG. 5

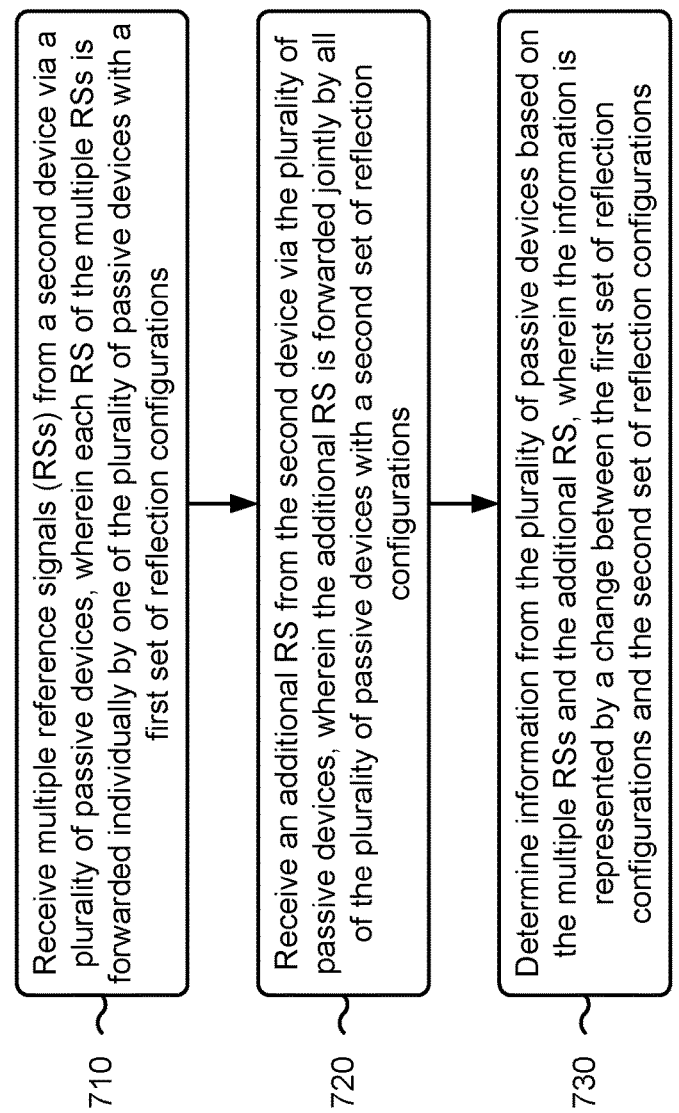

710 Receive multiple reference signals (RSs) from a second device via a plurality of passive devices, wherein each RS of the multiple RSs is forwarded individually by one of the plurality of passive devices with a first set of reflection configurations 720 Receive an additional RS from the second device via the plurality of passive devices, wherein the additional RS is forwarded jointly by all of the plurality of passive devices with a second set of reflection configurations 730 Determine information from the plurality of passive devices based on the multiple RSs and the additional RS, wherein the information is represented by a change between the first set of reflection configurations and the second set of reflection configurations

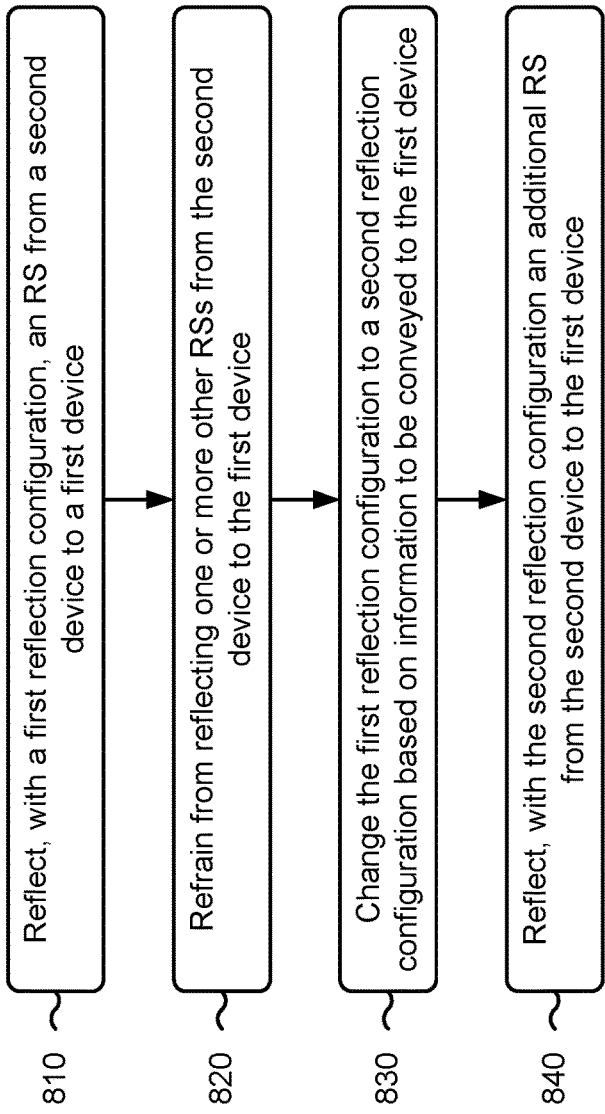

810 — Reflect, with a first reflection configuration, an RS from a second device to a first device 820 — Refrain from reflecting one or more other RSs from the second device to the first device 830 — Change the first reflection configuration to a second reflection configuration based on information to be conveyed to the first device 840 — Reflect, with the second reflection configuration an additional RS from the second device to the first device

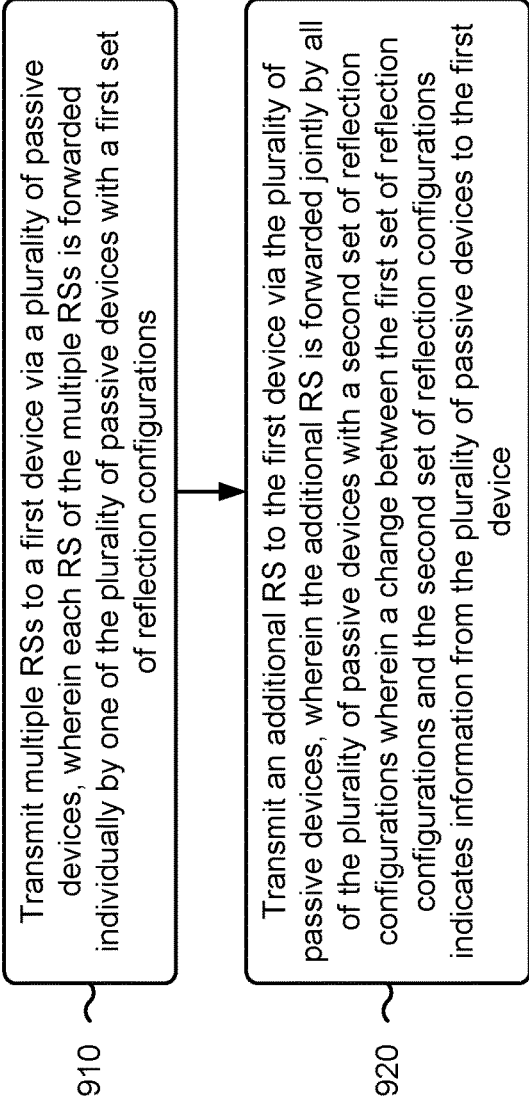

Transmit multiple RSs to a first device via a plurality of passive devices, wherein each RS of the multiple RSs is forwarded individually by one of the plurality of passive devices with a first set of reflection configurations Transmit an additional RS to the first device via the plurality of passive devices, wherein the additional RS is forwarded jointly by all of the plurality of passive devices with a second set of reflection configurations wherein a change between the first set of reflection configurations and the second set of reflection configurations indicates information from the plurality of passive devices to the first device

PASSIVE DEVICE INFORMATION

CROSS-REFERENCE TO RELATED APPLICATION

This Patent Application is a 371 national stage of PCT Application No. PCT/CN2021/099348 filed on Jun. 10, 2021, entitled "PASSIVE DEVICE INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for obtaining information from a passive device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first device includes receiving multiple reference signals (RSs) from a second device via a plurality of passive devices, where each RS of the multiple RSs is forwarded individually by one of the plurality of passive devices with a first set of reflection configurations. The method may include receiving an additional RS from the second device via the plurality of passive devices, where the additional RS is forwarded jointly by all of the plurality of passive devices with a second set of reflection configurations. The method may include determining information from the plurality of passive devices based on the multiple RSs and the additional RS, where the information is represented by a change between the first set of reflection configurations and the second set of reflection configurations.

In some aspects, a method of wireless communication performed by a passive device includes reflecting, with a first reflection configuration, an RS from a second device to a first device, refraining from reflecting one or more other RSs from the second device to the first device, changing the first reflection configuration to a second reflection configuration based on information to be conveyed to the first device, and reflecting, with the second reflection configuration an additional RS from the second device to the first device.

In some aspects, a method of wireless communication performed by a second device includes transmitting multiple RSs to a first device via a plurality of passive devices, wherein each RS of the multiple RSs is forwarded individually by one of the plurality of passive devices with a first set of reflection configurations, and transmitting an additional RS to the first device via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the first device.

In some aspects, a first device for wireless communication includes a memory and one or more processors, coupled to the memory, configured to receive multiple RSs from a second device via a plurality of passive devices, where each RS of the multiple RSs is forwarded individually by one of the plurality of passive devices with a first set of reflection configurations. The one or more processors may be configured to receive an additional RS from the second device via the plurality of passive devices, where the additional RS is forwarded jointly by all of the plurality of passive devices with a second set of reflection configurations, and determine information from the plurality of passive devices based on the multiple RSs and the additional RS, where the information is represented by a change between the first set of reflection configurations and the second set of reflection configurations.

In some aspects, a passive device for wireless communication includes a memory and one or more processors, coupled to the memory, configured to reflect, with a first reflection configuration, an RS from a second device to a first device, refrain from reflecting one or more other RSs from the second device to the first device, change the first reflection configuration to a second reflection configuration based on information to be conveyed to the first device, and reflect, with the second reflection configuration an additional RS from the second device to the first device.

In some aspects, a second device for wireless communication includes a memory and one or more processors, coupled to the memory, configured to transmit multiple RSs to a first device via a plurality of passive devices, where each RS of the multiple RSs is forwarded individually by one of the plurality of passive devices with a first set of reflection configurations, and transmit an additional RS to the first device via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the first device.

In some aspects, a non-transitory computer-readable medium storing a set of instructions for wireless communication includes one or more instructions that, when executed by one or more processors of a first device, cause the first device to receive multiple RSs from a second device via a plurality of passive devices, where each RS of the multiple RSs is forwarded individually by one of the plurality of passive devices with a first set of reflection configurations, receive an additional RS from the second device via the plurality of passive devices, where the additional RS is forwarded jointly by all of the plurality of passive devices with a second set of reflection configurations, and determine information from the plurality of passive devices based on the multiple RSs and the additional RS, where the information is represented by a change between the first set of reflection configurations and the second set of reflection configurations.

In some aspects, a non-transitory computer-readable medium storing a set of instructions for wireless communication includes one or more instructions that, when executed by one or more processors of a passive device, cause the passive device to reflect, with a first reflection configuration, an RS from a second device to a first device, refrain from reflecting one or more other RSs from the second device to the first device, change the first reflection configuration to a second reflection configuration based on information to be conveyed to the first device, and reflect, with the second reflection configuration, an additional RS from the second device to the first device.

In some aspects, a non-transitory computer-readable medium storing a set of instructions for wireless communication includes one or more instructions that, when executed by one or more processors of a second device, cause the second device to transmit multiple RSs to a first device via a plurality of passive devices, where each RS of the multiple RSs is forwarded individually by one of the plurality of passive devices with a first set of reflection configurations, and transmit an additional RS to the first device via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the first device.

In some aspects, an apparatus for wireless communication includes means for receiving multiple RSs from another apparatus via a plurality of passive devices, where each RS of the multiple RSs is reflected individually by one of the plurality of passive devices with a first set of reflection configurations, means for receiving an additional RS from the second device via the plurality of passive devices, where the additional RS is reflected jointly by all of the plurality of passive devices with a second set of reflection configurations, and means for determining information from the plurality of passive devices based on the multiple RSs and the additional RS, where the information is represented by a change between the first set of reflection configurations and the second set of reflection configurations.

In some aspects, an apparatus for wireless communication includes means for reflecting, with a first reflection configuration, an RS from a second device to a first device, means for refraining from reflecting one or more other RSs from the second device to the first device, means for changing the first reflection configuration to a second reflection configuration based on information to be conveyed to the first device, and means for reflecting, with the second reflection configuration an additional RS from the second device to the first device.

In some aspects, an apparatus for wireless communication includes means for transmitting multiple RSs to another apparatus via a plurality of passive devices, where each RS of the multiple RSs is forwarded individually by one of the plurality of passive devices with a first set of reflection configurations, and means for transmitting an additional RS to the other apparatus via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the other apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of using a passive device, in accordance with the present disclosure.

FIG. 4 is a diagram illustrating an example of a passive device providing information, in accordance with the present disclosure.

FIG. 5 is a diagram illustrating an example of obtaining information from passive devices, in accordance with the present disclosure.

FIG. 7 is a diagram illustrating an example process performed, for example, by a first device, in accordance with the present disclosure.

FIG. 8 is a diagram illustrating an example process performed, for example, by a passive device, in accordance with the present disclosure.

FIG. 9 is a diagram illustrating an example process performed, for example, by a second device, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
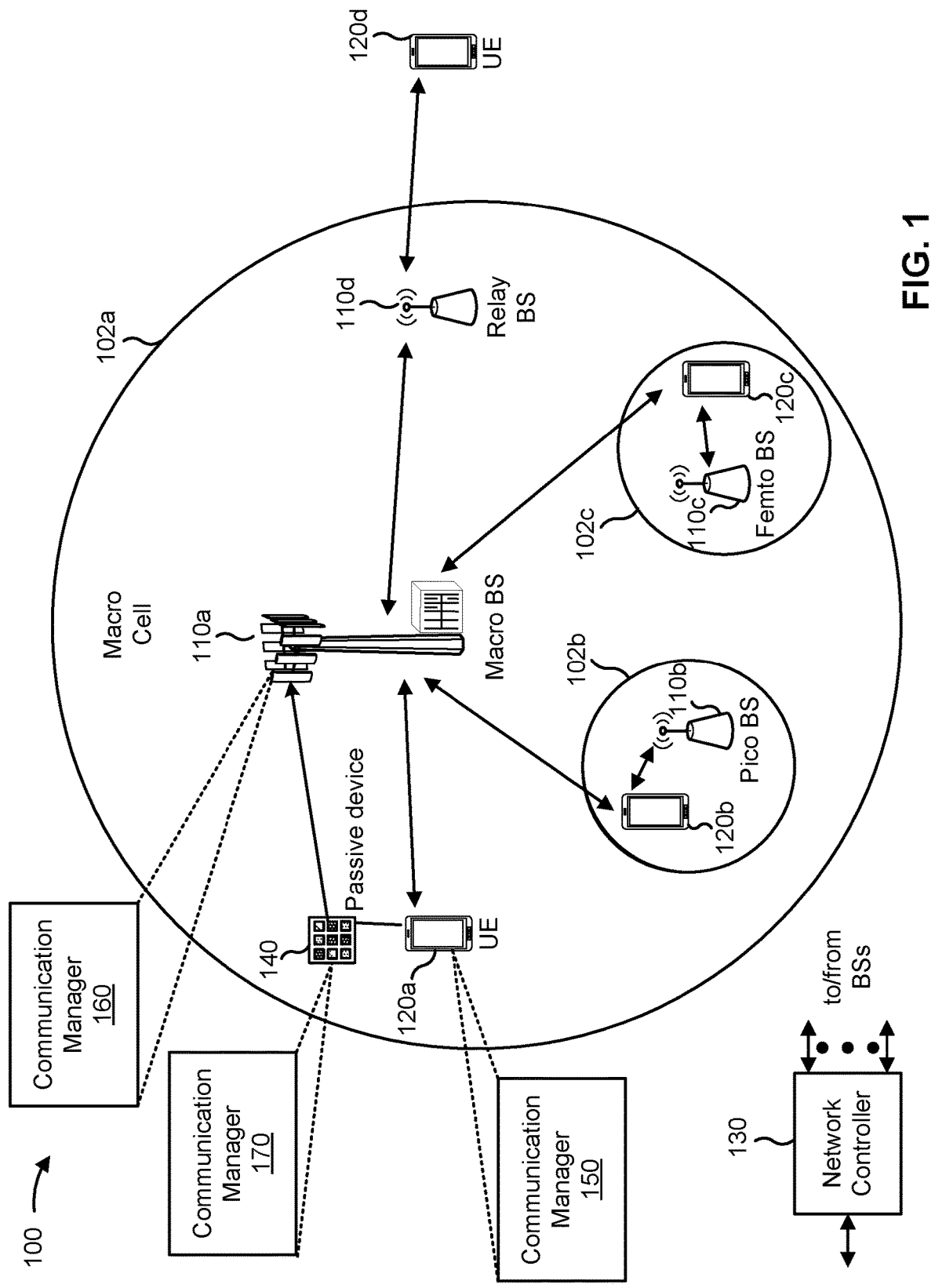
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell(e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller may couple to a set of BSs and may provide coordination and control for these BSs. The network controller may communicate with the BSs via a backhaul. The BSs may also communicate with one another directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Wireless network 100 shows a first device (e.g., UE 120*a*, base station 110) that may communicate with a second device (e.g., base station 110, UE 120*a*) directly or by reflecting signals via a passive device 140 (e.g., a reconfigurable intelligent surface (RIS)).

In some aspects, the first device may include a communication manager 160 in an uplink scenario (or communication manager 150 in a downlink scenario). As described in more detail elsewhere herein, the communication manager 160 may receive multiple reference signals (RSs) from a second device via a plurality of passive devices, where each RS of the multiple RSs is forwarded individually by one of the plurality of passive devices with a first set of reflection configurations. The communication manager 160 may receive an additional RS from the second device via the plurality of passive devices, where the additional RS is forwarded jointly by all of the plurality of passive devices with a second set of reflection configurations. The communication manager 160 may determine information from the plurality of passive devices based on the multiple RSs and the additional RS, where the information is represented by a change between the first set of reflection configurations and the second set of reflection configurations. Additionally, or alternatively, the communication manager 160 may perform one or more other operations described herein.

In some aspects, the passive device may include a communication manager 170. As described in more detail elsewhere herein, the communication manager 170 may reflect, with a first reflection configuration, an RS from a second device to a first device, refrain from reflecting one or more other RSs from the second device to the first device, change the first reflection configuration to a second reflection configuration based on information to be conveyed to the first device, and reflect, with the second reflection configuration, an additional RS from the second device to the first device. Additionally, or alternatively, the communication manager 170 may perform one or more other operations described herein.

In some aspects, the second device may include a communication manager 150 in an uplink scenario (or communication manager 160 in a downlink scenario). As described in more detail elsewhere herein, the communication manager 150 may transmit multiple RSs to a first device via a plurality of passive devices, where each RS of the multiple RSs is forwarded individually by one of the plurality of passive devices with a first set of reflection configurations, and transmit an additional RS to the first device via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the first device. Additionally, or alternatively, the communication manager 150 may perform one or more other operations described herein.

As indicated above, FIG. 1 is provided as an example. Other examples may differ from what is described with regard to FIG. 1.

Figure 2:
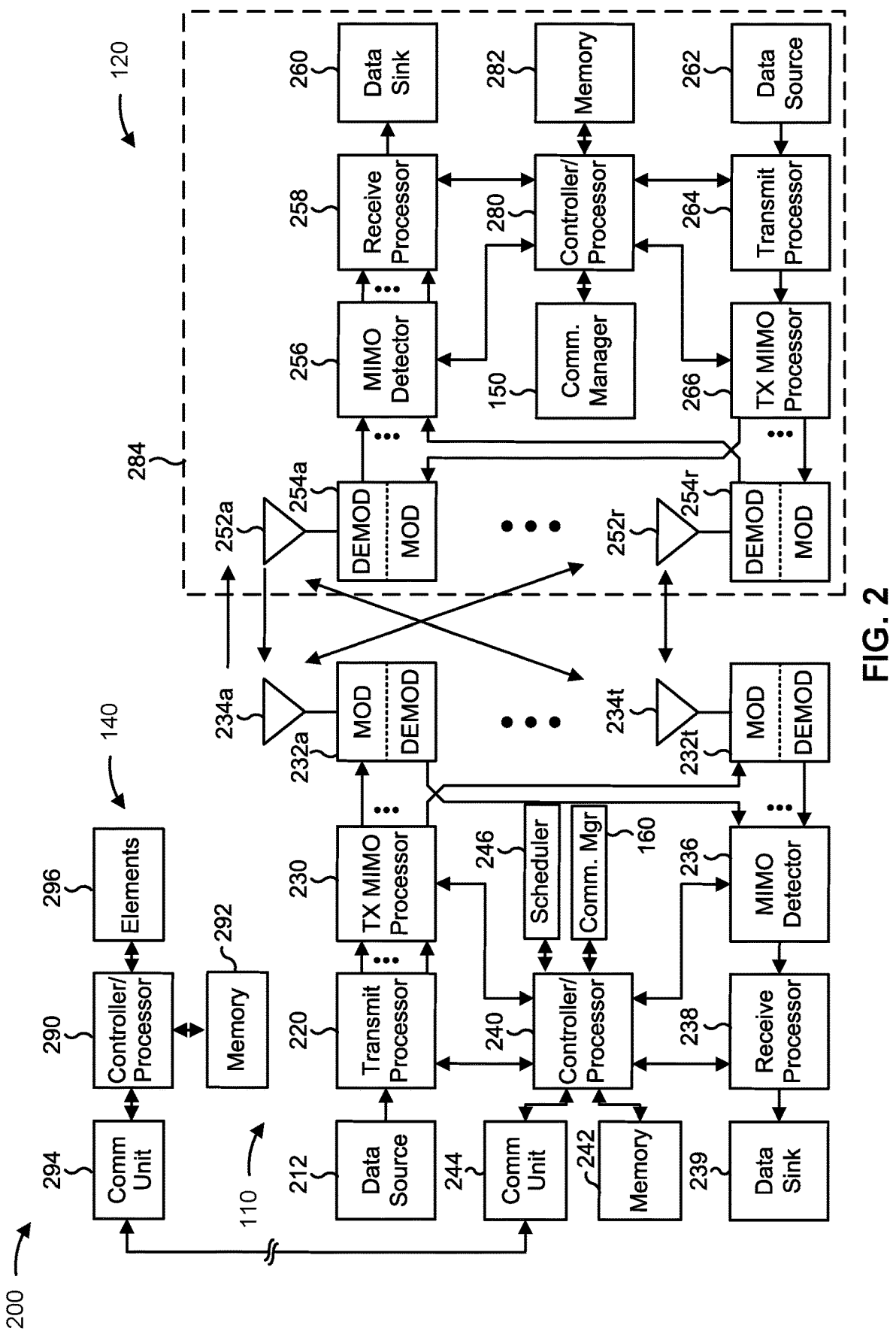
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS)

or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide Toutput symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of the UE 120 may be included in a housing 284.

The passive device 140 may include communication unit 294, controller/processor 290, memory 292, and surface elements 296. The controller/processor 290 may control a configuration (e.g., reflective direction) of the surface elements 296 by applying voltage to specific elements of the surface elements 296. The passive device 140 may communicate with the base station 110 via the communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-12).

Controller/processor 240 of the base station 110, controller/processor 280 of the UE 120, and/or any other component(s) of FIG. 2 may perform one or more techniques associated with obtaining information from passive devices, as described in more detail elsewhere herein. For example, controller/processor 240 of base station 110, controller/processor 280 of the UE 120, controller/processor 290 of the passive device 140, and/or any other component(s) of FIG. 2 may perform or direct operations of, for example, process 700 of FIG. 7, process 800 of FIG. 8, process 900 of FIG. 9, and/or other processes as described herein. Memories 242, 282, and 292 may store data and program codes for the base station 110, the UE 120, and the passive device 140, respectively. In some aspects, memory 242, memory 282, and/or memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the passive device 140, and/or the UE 120 may cause the one or more processors, the base station 110, the passive device 140, and/or the UE 120 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a first device (e.g., UE 120, base station 110) includes means for receiving multiple RSs from a second device (e.g., base station 110, UE 120) via a plurality of passive devices, where each RS of the multiple RSs is forwarded individually by one of the plurality of passive devices with a first set of reflection configurations, means for receiving an additional RS from the second device via the plurality of passive devices, where the additional RS is forwarded jointly by all of the plurality of passive devices with a second set of reflection configurations, and/or means for determining information from the plurality of passive devices based on the multiple RSs and the additional RS, where the information is represented by a change between the first set of reflection configurations and the second set of reflection configurations. In some aspects, the means for the first device to perform operations described herein may include, for example, one or more of communication manager 160, transmit processor 220, TX MIMO processor 230, modulator 232, antenna 234, demodulator 232, MIMO detector 236, receive processor 238, controller/processor 240, memory 242, or scheduler 246. In some aspects, the means for the first device to perform operations described herein may include, for example, one or more of communication manager 150, antenna 252, demodulator 254, MIMO detector 256, receive processor 258, transmit processor 264, TX MIMO processor 266, modulator 254, controller/processor 280, or memory 282.

In some aspects, the passive device 140 includes means for reflecting, with a first reflection configuration, an RS from a second device to a first device, means for refraining from reflecting one or more other RSs from the second device to the first device, means for changing the first reflection configuration to a second reflection configuration based on information to be conveyed to the first device, and/or means for reflecting, with the second reflection configuration, an additional RS from the second device to the first device. In some aspects, the means for the passive device to perform operations described herein may include, for example, one or more of communication manager 170, communication unit 294, controller/processor 290, memory 292, or surface elements 296.

In some aspects, a second device (e.g., UE 120, base station 110) includes means for transmitting multiple RSs to a first device via a plurality of passive devices, where each RS of the multiple RSs is forwarded individually by one of the plurality of passive devices with a first set of reflection configurations, and/or means for transmitting an additional RS to the first device via the plurality of passive devices. The additional RS may be forwarded jointly by all of the plurality of passive devices with a second set of reflection configurations, and a change between the first set of reflection configurations and the second set of reflection configurations may indicate information from the plurality of passive devices to the first device. In some aspects, the means for the second device to perform operations described herein may include, for example, one or more of communication manager 160, transmit processor 220, TX MIMO processor 230, modulator 232, antenna 234, demodulator 232, MIMO detector 236, receive processor 238, controller/processor 240, memory 242, or scheduler 246. In some aspects, the means for the second device to perform operations described herein may include, for example, one or more of communication manager 150, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of using a passive device, in accordance with the present disclosure. Example 300 shows a base station 310 (e.g., BS 110) that may communicate with a UE 320 (e.g., UE 120), and a BS 330 (e.g., BS 110) that may communicate with UE 340 (e.g., UE 120).

A network may have antennas that are grouped together at a transmitter or receiver, in order to increase throughput. The grouping of antennas may be referred to as "massive MIMO." Massive MIMO may use active antenna units (AAUs) to achieve high beamforming gain. An AAU may combine an antenna, a radio, a tower-mounted amplifier, a feeder, and/or jumper functionalities into a single unit. An AAU may include an individual radio frequency (RF) chain for each antenna port.

There may be barriers to massive MIMO. The transmission of signals may be blocked by buildings, natural topography, or other blocking structures. For example, BS 310 may transmit signals to UE 320, but BS 310 may not able to transmit signals to UE 340. As shown in example 300, there is some type of blockage between BS 310 and UE 340. UE 340 may instead be served by BS 330.

In order to resolve transmission issues due to the blockage, the network may use a passive device 350 (e.g., passive device 140). The passive device 350 may be a device that forwards, relays, repeats, or reflects in a passive or near passive manner. The passive device 350 may be configured as an RIS. An RIS may be a two-dimensional surface of engineered material whose properties are reconfigurable rather than static. The engineered material may contain integrated electronic circuits and software that enable the control of a wireless medium by altering an impedance of the surface or a portion of the surface. The change in impedance may alter a phase shift and/or an angle of reflection. Scattering, absorption, reflection, and diffraction properties may be changed with time and controlled by the software. An RIS may act as a reflective lens. In one example, an RIS may include large arrays of inexpensive antennas spaced half of a wavelength apart. In another example, an RIS may include metamaterial-based planar or conformal large surfaces whose elements (e.g., square elements) have sizes and inter-distances that are smaller than the wavelength. Each of the elements may have a configured impedance or other surface properties that are controlled by a voltage to the element. An RIS may also be referred to as a "software-controlled metasurface" or an "intelligent reflecting surface".

The passive device 350, when configured to operate as an RIS, may not have antennas or RF chains of its own, but may include a large number of small, low-cost elements on a surface to passively reflect incident signals transmitted from BS 310. A controller of the passive device 350 may control the elements on the surface. The passive device 350 may be a smart device that is configured to use a specific angle of reflection for the signals. BS 310 may control, as part of a reflective configuration, the angle of reflection (angle of arrival, angle of departure), an amplitude, a weight, a phase, and/or a width of the elements of the passive device 350 by controlling a voltage to each of the elements. The reflective configuration may also correspond to reflecting weights or coefficients that are provided by the passive device when reflecting signals from one device to another. The reflective configuration may also be referred to as an "RIS reflection configuration," an "RIS reflection matrix," or a "P-MIMO configuration." In sum, the passive device 350 may help to control a propagation environment with less power consumption than AAUs. Passive devices may even replace AAUs in the propagation environment. MIMO that uses passive devices may be referred to as "passive MIMO" or "P-MIMO". The passive device 350 may be also referred to as a "passive node" or a "P-MIMO device".

In some aspects, BS 310 may configure the passive device 350 by sending a control signal with information for configuring the properties and/or timing of the elements. For example, BS 310 may transmit a set of beam weights to the passive device 350 through explicit signaling (e.g., radio resource control (RRC) signaling) instead of using beam sweeping. However, the passive device 350 may not provide any feedback to the BS 310 as to whether the control signal from the BS 310 is successfully received. If the passive device 350 does not successfully receive the control signal or successfully reconfigure properties of the passive device 350, the BS 310 and other UEs may process with using the passive device for reflecting signals that will be not be properly reflected in the expected directions. Improperly reflected signals will degrade communications, and degraded communications may cause UE 340 and BS 310 to consume additional processing resources and signaling resources with retransmissions.

In some aspects, the BS 310 may transmit a control signal to the passive device 350 for operation of the passive device, and the passive device 350 may provide information back to the BS 310. For example, the passive device 350 may provide a few bits of RIS-side information, such as an indication of an acknowledgement (ACK) or a negative acknowledgment (NACK) of the control signal. The information may also indicate quality of the channel. This may be helpful to the BS 310, because the BS 310 may only see an aggregate (concatenation) of a signal on the leg between the UE 320 and the passive device 350 and a signal on the leg between the passive device 350 and the BS 310. On the other hand, the passive device 350 may measure a quality of each of the legs individually. The passive device 350 may also indicate a presence of the passive device 350 to the network. However, if there are multiple passive devices in the network, or if different segments of the passive device 350 are operating independently, the BS 310 may expect to obtain information for each passive device.

As indicated above, FIG. 3 is provided as an example. Other examples may differ from what is described with regard to FIG. 3.

FIG. 4 is a diagram illustrating an example 400 of a passive device providing information, in accordance with the present disclosure. Example 400 shows that the UE 320 may transmit multiple RSs to the BS 310 via multiple passive devices, such as via a first RIS 410 and a second RIS 420.

The BS 310 may be aware of multiple passive devices in the network, and a passive devise may have different segments that operate independently. The BS 310 may prepare to obtain information (side information) from the passive devices. The BS 310 may use downlink control information (DCI) to schedule each passive device in the network on different time slots. In a first time slot 402, the UE 320 may transmit a first RS to RIS 410 with a first reflective configuration $\Phi_1$ of RIS 410 and to RIS 420 with a first reflective configuration $\ominus_1$ of RIS 420. The reflective configurations used during slot 402 may be referred to as a first set of reflective configurations, and the overall effective channel for a leg may be defined as H=channel (UE 320 to RIS) * reflective configuration * channel (RIS to gNB). In a second time slot 404, the UE 320 may transmit a second RS to RIS 410 with a second reflective configuration $\Phi_2$ of RIS 410 and to RIS 420 with a first reflective configuration $\ominus_1$ of RIS 420. The reflective configurations used during slot 404 may be referred to as a second set of reflective configurations. The BS 310 may determine information from RIS 410 based on a change from the first reflective configuration $\Phi_1$ of RIS 410 to the second reflective configuration $\Phi_2$ of RIS 410. Note that the reflective configuration $\ominus_1$ of RIS 420 does not change between the first set of reflective configurations in slot 402 and the second set of reflective configurations in slot 404 in order for RIS 410 to convey information to BS 310 by a change in the reflective configurations of RIS 410.

RIS 420 may convey information to the BS 310 in a similar fashion. In a third time slot 406, the UE 320 may transmit a third RS to RIS 410 with a first reflective configuration $\Phi_1$ of RIS 410 and to RIS 420 with a first reflective configuration $\ominus_1$ of RIS 420. In a fourth time slot 408, the UE 320 may transmit a fourth RS to RIS 410 with a first reflective configuration $\Phi_1$ of RIS 410 and to RIS 420 with a second reflective configuration $\ominus_2$ of RIS 420. The BS 310 may determine information from RIS 420 based on a change from the first reflective configuration $\ominus_1$ of RIS 420 to the second reflective configuration $\ominus_2$ of RIS 420. Note that the reflective configuration $\Phi_1$ of RIS 410 does not change between the first set of reflective configurations in slot 406 and the second set of reflective configurations in slot 408 in order for RIS 420 to convey information to BS 310 by a change in the reflective configurations of RIS 420.

In other words, if there are N RISs in the network and 2 RSs are to be transmitted for each RIS for the RIS to convey information to the BS 310, then the BS 310 may need 2N RSs. However, if there are 20 RISs in the network, to obtain information from the 20 RISs may involve 40 RSs in 40 time slots. This may cause the BS 310, the RISs, and the UE 320 to consume significant time, processing resources, and signaling resources.

As indicated above, FIG. 4 is provided as an example. Other examples may differ from what is described with regard to FIG. 4.

FIG. 5 is a diagram illustrating an example 500 of obtaining information from passive devices, in accordance with the present disclosure. Example 500 shows the BS 310 and the UE 320 that may communicate with each other via multiple passive devices, such as via the RIS 410 and the RIS 420.

According to various aspects described herein, the BS 310 may obtain information from passive devices with less time and with less consumption of resources. The information may include feedback for a control signal that the BS 310 transmitted to each of the RISs. The BS 310 may receive a RS via each RIS individually, and the BS 310 may receive an additional RS via all the RISs jointly. For example, the BS 310 may receive a first RS reflected via RIS 410 in time slot 502 (first reflective configuration for RIS 410) and perform a first channel estimation. RIS 420 may not reflect the first RS towards the BS 310 (e.g., RIS 420 deactivated, set to not reflect, or set to scatter reflect rather than beamform reflect). The BS 310 may receive a second RS reflected via RIS 420 in slot 504 (first reflective configuration for RIS 420) and perform a second channel estimation. RIS 410 may not reflect the second RS towards the BS 310. The first reflective configuration for RIS 410 and the first reflective configuration for RIS 420 may be referred to as a first set of reflective configurations. In slot 506, the BS 310 may receive an additional RS via both RIS 410 and RIS 420 jointly and perform a third channel estimation. RIS 410 and RIS 420 are both activated and reflecting the additional RS towards the BS 310. Each of RIS 410 and RIS 420 may use a second reflective configuration to indicate information (e.g., ACK, NACK) by a change of reflective configurations. The second reflective configurations used by the RISs for the additional RS may be referred to as a second set of reflective configurations.

The BS 310 may determine the information for each respective RIS based on a change of configurations for the respective RIS. The change may be decoded based on the first channel estimation, the second channel estimation, and the third channel estimation. For example, the BS 310 may apply different hypotheses (e.g., weights, coefficients) to a difference between the third channel estimation and the first channel estimation to determine a change in reflective configurations that may convey information for RIS 410. The information conveyed to the BS 310 may include multiple portions, such as a first portion of information (e.g., control signal feedback) from RIS 410 and a second portion of information from RIS 420.

Instead of using 4 reference signals and 4 time slots (2N instances) to obtain information from 2 RISs, the BS 310 may use 3 reference signals and 3 time slots (N+1 instances). For 20 RISs, this could mean a difference between 40 (2*20) instances and 21 (20+1) instances. As a result, the BS 310, RIS 410, RIS 420, and the UE 320 conserve time, processing resources, and signaling resources using an N+1 approach rather than the previous 2N approach.

While example 500 describes the BS 310 determining passive device information from reference signals transmitted by the UE 320 via passive devices (uplink-based scenario), alternatively, the UE 320 may determine passive device information from reference signals transmitted by UE 320 via the passive devices (downlink-based scenario). The UE 320 may then provide the information to the BS 310.

As indicated above, FIG. 5 is provided as an example. Other examples may differ from what is described with regard to FIG. 5.

Figure 6:
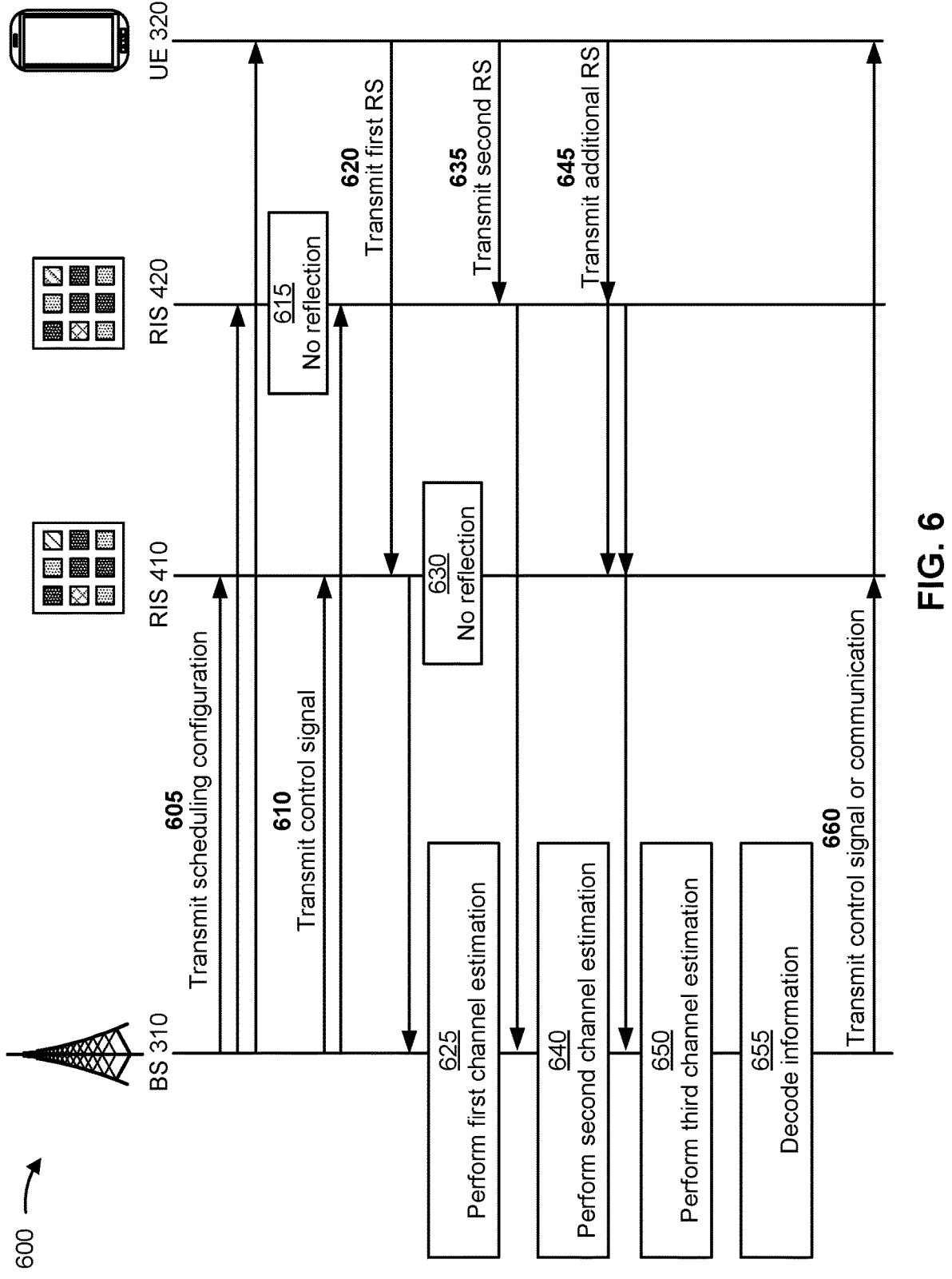
FIG. 6 is a diagram illustrating an example of obtaining information from passive devices, in accordance with the present disclosure.

FIG. 6 is a diagram illustrating an example 600 of obtaining information from passive devices, in accordance with the present disclosure. Example 600 shows the BS 310 and the UE 320 that may communicate with each other via multiple passive devices, such as via RIS 410 and RIS 420. The communication may be in a wireless network, such as in wireless network 100.

The BS 310 may prepare to configure or reconfigure one or more passive devices with one or more control signals. Example 600 shows an example with control signals to RIS 410 and RIS 420, but example 600 may apply to more than 2 RISs. As shown by reference number 605, the BS 310 may transmit a scheduling configuration to RIS 410, RIS 420, and UE 320 in preparation for obtaining information (e.g., feedback for the control signals) from RIS 410, RIS 420 (and other passive devices). The scheduling configuration may indicate when UE 320 is to transmit a first RS with RIS 410 individually reflecting to the BS 310 and RIS 420 refraining from reflecting to the BS 310. The scheduling configuration may indicate when UE 320 is to transmit a second RS with RIS 410 refraining from reflecting to the BS 310 and RIS 420 individually reflecting to the BS 310. In some aspects, the first RS and the second RS may be different instances of the same RS. The scheduling configuration may indicate when the UE 320 is to transmit an additional RS with both RIS 410 and RIS 420 reflecting to the BS 310 jointly.

In other words, the scheduling configuration may indicate that each RIS is to reflect an RS individually with a first set of reflective configurations (refrain from reflecting otherwise) and then reflect the additional RS jointly with a second set of reflective configurations as part of an N+1 approach. The scheduling configuration may indicate that the second set of reflective configurations may be used to change reflective configurations in such a way to convey the information to the BS 310. In some aspects, the scheduling configuration may be a value or index that is indicative of a stored scheduling configuration. The BS 310 may determine which passive devices are to provide feedback based at least in part on traffic conditions, channel conditions, RIS capabilities, RIs performances, and/or UE capabilities.

As shown by reference number 610, the BS 310 may transmit a control signal to RIS 410 and/or RIS 420 to configure or reconfigure operation of the respective RIS. This may include a change in a reflective direction or other specifics for one or more surface elements of the respective RIS. The control signal may also be used to indicate when the respective RIS is to activate or deactivate. The BS 310 may determine the control signals and the RISs that are involved based at least in part on traffic conditions, channel conditions, RIS capabilities, RIS performances, and/or UE capabilities.

As shown by reference number 615, RIS 420 may be set to no reflection for a first RS. As shown by reference number 620, the UE 320 may transmit the first RS to be reflected only by RIS 410. RIS 420 may receive the first RS but may deactivate during the first RS, scatter the first RS (not beamform towards the BS 310), or otherwise not reflect the first RS to the BS 310. As shown by reference number 625, the BS 310 may perform a first channel estimation with the reflected first RS. This may be in preparation for successive cancellation of received RSs, which may be used to determine information from specific RISs. The first received RS may be represented by $Y_1 = H_{1,1}\Phi_1 H_{1,2}X_1$, where $X_1$ is the first transmitted RS. The first channel estimation may be represented by $H_{1,1}\Phi_1 H_{1,2}$, where $H_{1,1}$ represents the leg from the UE 320 to RIS 410, $H_{1,2}$ represents the leg from RIS 410 to the BS 310, and $\Phi_1$ may be a reflective configuration for RIS 410 that is part of a first set of reflective configurations.

As shown by reference number 630, RIS 410 may be set to no reflection for a second RS. As shown by reference number 635, the UE 320 may transmit the second RS to be reflected only by RIS 420. RIS 410 may receive the first RS but may deactivate during the second RS, scatter the second RS (not beamform towards the BS 310), or otherwise not reflect the second RS to the BS 310. As shown by reference number 640, the BS 310 may perform a second channel estimation with the reflected second RS. The second received RS may be represented by $Y_2 = H_{2,1}\Phi_1 H_{2,2}X_2$, where $X_2$ is the second transmitted RS. The second channel estimation may be represented by $H_{2,1}\Phi_1 H_{2,2}$, where $H_{2,1}$ represents the leg from the UE 320 to RIS 420, $H_{2,2}$ represents the leg from RIS 420 to the BS 310, and $\Phi_1$ may be a reflective configuration for RIS 420 that is part of the first set of reflective configurations.

As shown by reference number 645, the UE 320 may transmit an additional RS that is reflected by both RIS 410 and RIS 420. As shown by reference number 650, the BS 310 may perform a third channel estimation with the reflected additional RS. The additional received RS may be represented by $Y_3 = H_{1,1}e^{jb_1}\Phi_1 H_{1,2}X_3 + H_{2,1}e^{jb_2}\Phi_1 H_{2,2}X_3$, where $X_3$ is the additional transmitted RS, $e^{jb_1}\Phi_1$ may be a reflective configuration for RIS 410 that is part of a second set of reflective configurations and $e^{jb_2}\Phi_1$ may be a reflective configuration for RIS 420 that is part of the second set of reflective configurations. The third channel estimation may be represented by $H_{1,1}e^{jb_1}\Phi_1 H_{1,2} + H_{2,1}e^{jb_2}\Phi_1 H_{2,2}$, where $e^{jb_1}$ represents a change between reflective configurations for RIS 410 and $e^{jb_2}$ represents a change between reflective configurations for RIS 420.

If the BS 310 is able to determine $e^{jb_1}$, then the BS 310 may determine a first portion of the information from the RISs that is, for example, feedback for RIS 410. If the BS 310 is able to determine $e^{jb_2}$, then the BS 310 may determine a second portion of the information from the RISs that is, for example, feedback for RIS 420. As shown by reference number 655, the BS 310 may decode the information based on the first channel estimation, the second channel estimation, and the third channel estimation. Given that the BS 310 knows $H_{1,1}\Phi_1 H_{1,2}$ and $H_{2,1}\Phi_1 H_{2,2}$, the BS 310 may test possible hypotheses for $(\hat{b}_1, \hat{b}_2)$ and find the pair that $$\text{minimizes} \left\| H - e^{jb_1}H_{1,1}\Phi H_{1,2} - e^{jb_2}H_{2,1}\Phi_1 H_{2,2} \right\|.$$

The closest hypotheses may be values for $(\hat{b}_1, \hat{b}_2)$ that reflect a change in reflective configurations for a particular RIS. One type of change may indicate an ACK for the particular RIS. A second type of change may indicate a NACK for the particular RIS. As shown by reference number 660, the BS 310 may transmit another control signal or a communication based at least in part on the information (e.g., feedback).

If there are more RISs, up to N RISs, the channel estimation for each RIS i of N RISs may be represented by $H_{i,1}\Phi_i H_{i,2}X$. The third channel estimation may be represented by $H = H_{1,1}e^{jb_1}\Phi_1 H_{1,2} + \ldots + H_{N,1}e^{jb_N}\Phi_N H_{N,2}$. The BS 310 may find $(\hat{b}_1, \ldots, \hat{b}_N)$ that $$\text{minimizes} \left\| H - \left( e^{jb_1}H_{1,1}\Phi_1 H_{1,2} + \ldots + e^{jb_N}H_{N,1}\Phi_N H_{N,2} \right) \right\|.$$

In some aspects, the BS 310 may reduce the number of hypotheses that are to be tested. This may include using a type of solution that tests hypotheses that are close to other hypotheses, as if the hypotheses were closely located in a lattice-type structure formed by the possible hypotheses. For example, assuming that $$\hat{b}_1 \in \left\{ 0, \frac{\pi}{2}, \pi, \frac{3\pi}{2} \right\},$$

this is similar to two instances of the Closest Vector Problem (CVP) (one for the real part and one for the imaginary part), where the lattice is characterized via the basis $H_{1,1}\Phi_1 H_{1,2}, \ldots, H_{N,1}\Phi_1 H_{N,2}$. To lower the complexity, the BS 310 may use sphere decoding instead of an exhaustive search over all possible $(\hat{b}_1, \ldots, \hat{b}_N)$. Sphere decoding may involve using hypotheses in a sphere-like lattice structure that are located closer together.

While example 600 shows a downlink-based scenario, alternatively, the BS 310 may transmit the RSs as described for the UE 320 in example 600, and the UE 320 may receive and decode the RSs reflected from the RISs as described for the BS 310 in example 600, as part of an uplink-based scenario. The UE 320 may perform the first channel estimation, the second channel estimation, and the third channel estimation $(H=H_{1,1}e^{jb_1}\Phi_1 H_{1,2}+ \ldots +H_{N,1}e^{jb_N}\Phi_N H_{N,2})$ and find $(\hat{b}_1, \ldots, \hat{b}_N)$ that $$\text{minimizes}\left\|H - \left(e^{j\hat{b}_1}H_{1,1}\Phi_1 H_{1,2} + \ldots + e^{j\hat{b}_N}H_{N,1}\Phi_N H_{N,2}\right)\right\|.$$

The UE 320 may the report the $(\hat{b}_1, \ldots \hat{b}_N)$ to the BS 310. By using an N+1 approach rather than a 2N approach, the BS 310 (or the UE 320) may more quickly and efficiently obtain feedback or other information from passive devices that use reflective configuration changes to convey such information.

As indicated above, FIG. 6 is provided as an example. Other examples may differ from what is described with regard to FIG. 6.

FIG. 7 is a diagram illustrating an example process 700 performed, for example, by a first device, in accordance with the present disclosure. Example process 700 is an example where the first device (e.g., BS 310, UE 320) performs operations associated with obtaining information from passive devices.

As shown in FIG. 7, in some aspects, process 700 may include receiving multiple RSs from a second device via a plurality of passive devices (block 710). For example, the first device (e.g., using communication manager 160, communication manager 150, and/or reception component 1002 depicted in FIG. 10) may receive multiple RSs from a second device via a plurality of passive devices, as described above. In some aspects, each RS of the multiple RSs is forwarded individually by one of the plurality of passive devices with a first set of reflection configurations.

As further shown in FIG. 7, in some aspects, process 700 may include receiving an additional RS from the second device via the plurality of passive devices (block 720). For example, the first device (e.g., using communication manager 160, communication manager 150, and/or reception component 1002 depicted in FIG. 10) may receive an additional RS from the second device via the plurality of passive devices, as described above. In some aspects, the additional RS is forwarded jointly by all of the plurality of passive devices with a second set of reflection configurations.

As further shown in FIG. 7, in some aspects, process 700 may include determining information from the plurality of passive devices based on the multiple RSs and the additional RS (block 730). For example, the first device (e.g., using communication manager 160, communication manager 150, and/or determination component 1008 depicted in FIG. 10) may determine information from the plurality of passive devices based on the multiple RSs and the additional RS, as described above. In some aspects, the information may be represented by a change between the first set of reflection configurations and the second set of reflection configurations.

Process 700 may include additional aspects, such as any single aspect or any combination of aspects described below and/or in connection with one or more other processes described elsewhere herein.

In a first aspect, process 700 includes transmitting an update message to at least one of the plurality of passive devices based on the information.

In a second aspect, alone or in combination with the first aspect, process 700 includes transmitting a control signal to at least one passive device of the plurality of passive devices for operating the at least one passive device, and the information is feedback for the control signal.

In a third aspect, alone or in combination with one or more of the first and second aspects, process 700 includes transmitting the information to the second device.

In a fourth aspect, alone or in combination with one or more of the first through third aspects, the information includes a first portion corresponding to a change between a first reflection configuration and a second reflection configuration for a first passive device of the plurality of passive devices and a second portion corresponding to a change between a first reflection configuration and a second reflection configuration for a second passive device of the plurality of passive devices, and determining the information includes performing first channel estimation on a first RS of the multiple RSs for the first passive device, performing second channel estimation on a second RS of the multiple RSs for the second passive device, performing third channel estimation on the additional RS, and decoding the first portion of the information and the second portion of the information based on the first channel estimation, the second channel estimation, and the third channel estimation.

In a fifth aspect, alone or in combination with one or more of the first through fourth aspects, the change between the first reflection configuration and the second reflection configuration for the first passive device indicates an acknowledgement.

In a sixth aspect, alone or in combination with one or more of the first through fifth aspects, the change between the first reflection configuration and the second reflection configuration for the first passive device indicates a negative acknowledgement.

In a seventh aspect, alone or in combination with one or more of the first through sixth aspects, decoding the first portion and the second portion includes testing hypotheses for candidate changes between the first reflection configuration and the second reflection configuration for the first passive device and for candidate changes between the first reflection configuration and the second reflection configuration for the second passive device.

In an eighth aspect, alone or in combination with one or more of the first through seventh aspects, decoding the first reflection configuration and the second reflection configuration includes using sphere decoding to limit a quantity of the hypotheses to be tested.

In a ninth aspect, alone or in combination with one or more of the first through eighth aspects, the receiving of the multiple RSs and the receiving of the additional RS are based on a scheduling configuration.

In a tenth aspect, alone or in combination with one or more of the first through ninth aspects, process 700 includes transmitting the scheduling configuration to one or more of the second device or the plurality of passive devices.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a passive device, in accordance with the present disclosure. Example process 800 is an example where the passive device (e.g., passive device 350, RIS 410, RIS 420) performs operations associated with providing passive device information.

As shown in FIG. 8, in some aspects, process 800 may include reflecting, with a first reflection configuration, an RS from a second device to a first device (block 810). For example, the passive device (e.g., using communication manager 170 and/or reflection component 1108 depicted in FIG. 11) may reflect, with a first reflection configuration, an RS from a second device to a first device, as described above.

As further shown in FIG. 8, in some aspects, process 800 may include refraining from reflecting one or more other RSs from the second device to the first device (block 820). For example, the passive device (e.g., using communication manager 170 and/or reflection component 1108 depicted in FIG. 11) may refrain from reflecting one or more other RSs from the second device to the first device, as described above.

As further shown in FIG. 8, in some aspects, process 800 may include changing the first reflection configuration to a second reflection configuration based on information to be conveyed to the first device (block 830). For example, the passive device (e.g., using communication manager 170 and/or reflection component 1108 depicted in FIG. 11) may change the first reflection configuration to a second reflection configuration based on information to be conveyed to the first device, as described above.

As further shown in FIG. 8, in some aspects, process 800 may include reflecting, with the second reflection configuration an additional RS from the second device to the first device (block 840). For example, the passive device (e.g., using communication manager 170 and/or reflection component 1108 depicted in FIG. 11) may reflect, with the second reflection configuration an additional RS from the second device to the first device, as described above.

Process 800 may include additional aspects, such as any single aspect or any combination of aspects described below and/or in connection with one or more other processes described elsewhere herein.

In a first aspect, the passive device is configured to operate as an RIS.

In a second aspect, alone or in combination with the first aspect, process 800 includes receiving a control signal for operating the passive device, where a change between the first reflection configuration and the second reflection configuration indicates an acknowledgement of the control signal.

In a third aspect, alone or in combination with one or more of the first and second aspects, process 800 includes receiving a control signal for operating the passive device, where a change between the first reflection configuration and the second reflection configuration indicates a negative acknowledgement.

In a fourth aspect, alone or in combination with one or more of the first through third aspects, process 800 includes receiving a scheduling configuration, where the reflecting of the RS, the refraining, and the reflecting of the additional RS are based on the scheduling configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a second device, in accordance with the present disclosure. Example process 900 is an example where the second device (e.g., UE 320, BS 310) performs operations associated with obtaining information from passive devices.

As shown in FIG. 9, in some aspects, process 900 may include transmitting multiple RSs to a first device via a plurality of passive devices (block 910). For example, the second device (e.g., using communication manager 150, communication manager 160, and/or transmission component 1204 depicted in FIG. 12) may transmit multiple RSs to a first device via a plurality of passive devices, as described above. In some aspects, each RS of the multiple RSs may be forwarded individually by one of the plurality of passive devices with a first set of reflection configurations As further shown in FIG. 9, in some aspects, process 900 may include transmitting an additional RS to the first device via the plurality of passive devices (block 920). For example, the second device (e.g., using communication manager 150, communication manager 160, and/or transmission component 1204 depicted in FIG. 12) may transmit an additional RS to the first device via the plurality of passive devices, as described above. In some aspects, the additional RS may be forwarded jointly by all of the plurality of passive devices with a second set of reflection configurations, and a change between the first set of reflection configurations and the second set of reflection configurations may indicate information from the plurality of passive devices to the first device.

Process 900 may include additional aspects, such as any single aspect or any combination of aspects described below and/or in connection with one or more other processes described elsewhere herein.

In a first aspect, process 900 includes receiving a scheduling configuration, where the transmitting of the multiple RSs and the transmitting of the additional RS are based on the scheduling configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
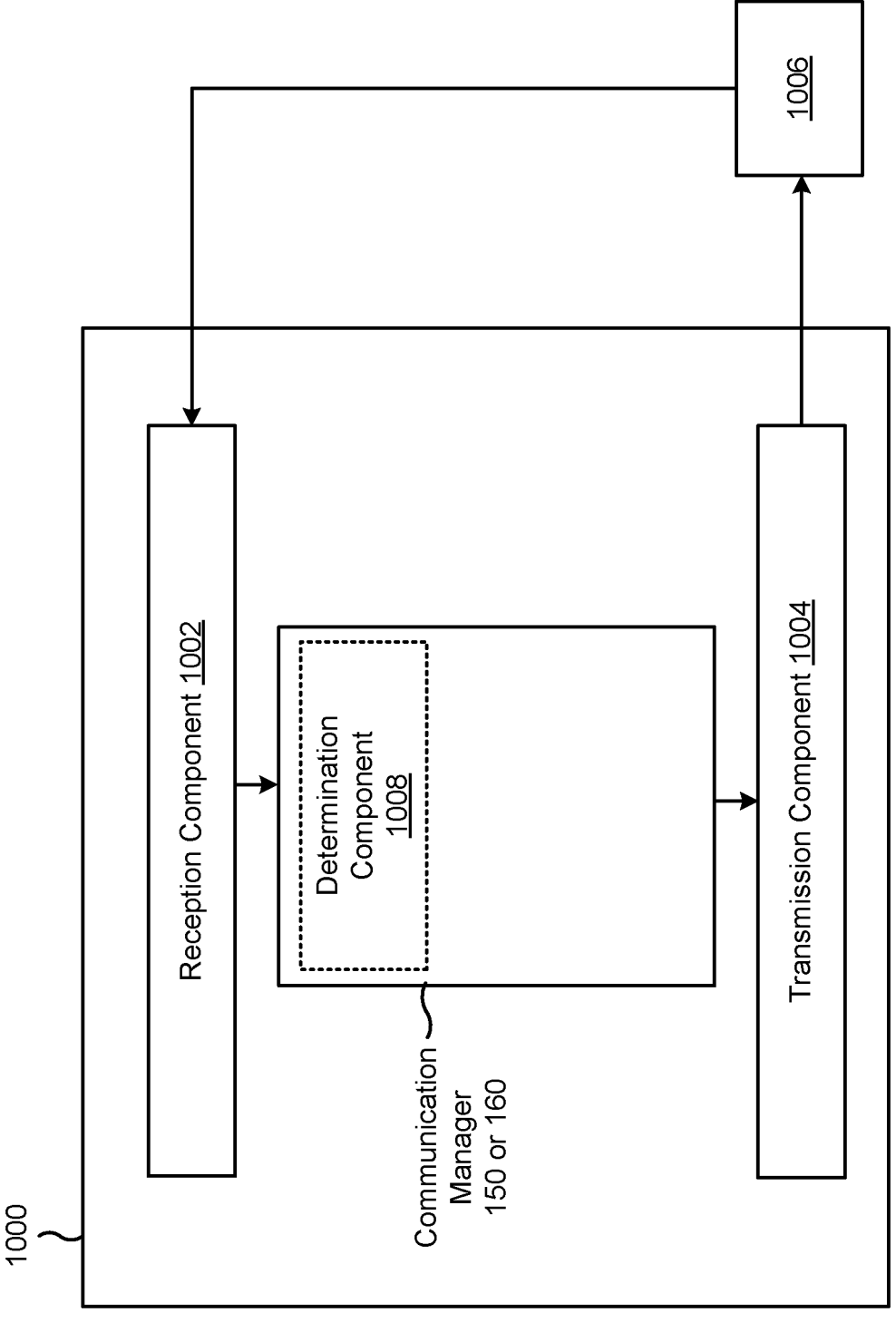
FIGS. 10-12 are block diagrams of example apparatuses for wireless communication, in accordance with the present disclosure.

FIG. 10 is a diagram of an example apparatus 1000 for wireless communication. The apparatus 1000 may be a first device (e.g., BS 310, UE 320), or a first device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a passive device, or another wireless communication device), directly or via a passive device, using the reception component 1002 and the transmission component 1004. As further shown, the apparatus 1000 may include the communication manager 150 or the communication manager 160. The communication manager 150 or the communication manager 160 may include a determination component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the first device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the first device described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first device described in connection with FIG. 2. In some aspects, the transmission component 1004 may be co-located with the reception component 1002 in a transceiver.

The reception component 1002 may receive multiple RSs from a second device via a plurality of passive devices, where each RS of the multiple RSs is forwarded individually by one of the plurality of passive devices with a first set of reflection configurations. The reception component 1002 may receive an additional RS from the second device via the plurality of passive devices, where the additional RS is forwarded jointly by all of the plurality of passive devices with a second set of reflection configurations. The determination component 1008 may determine information from the plurality of passive devices based on the multiple RSs and the additional RS, where the information is represented by a change between the first set of reflection configurations and the second set of reflection configurations.

The transmission component 1004 may transmit an update message to at least one of the plurality of passive devices based on the information. The transmission component 1004 may transmit a control signal to at least one passive device of the plurality of passive devices for operating the at least one passive device, and the information is feedback for the control signal. The transmission component 1004 may transmit the information to the second device. The transmission component 1004 may transmit the scheduling configuration to one or more of the second device or the plurality of passive devices.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
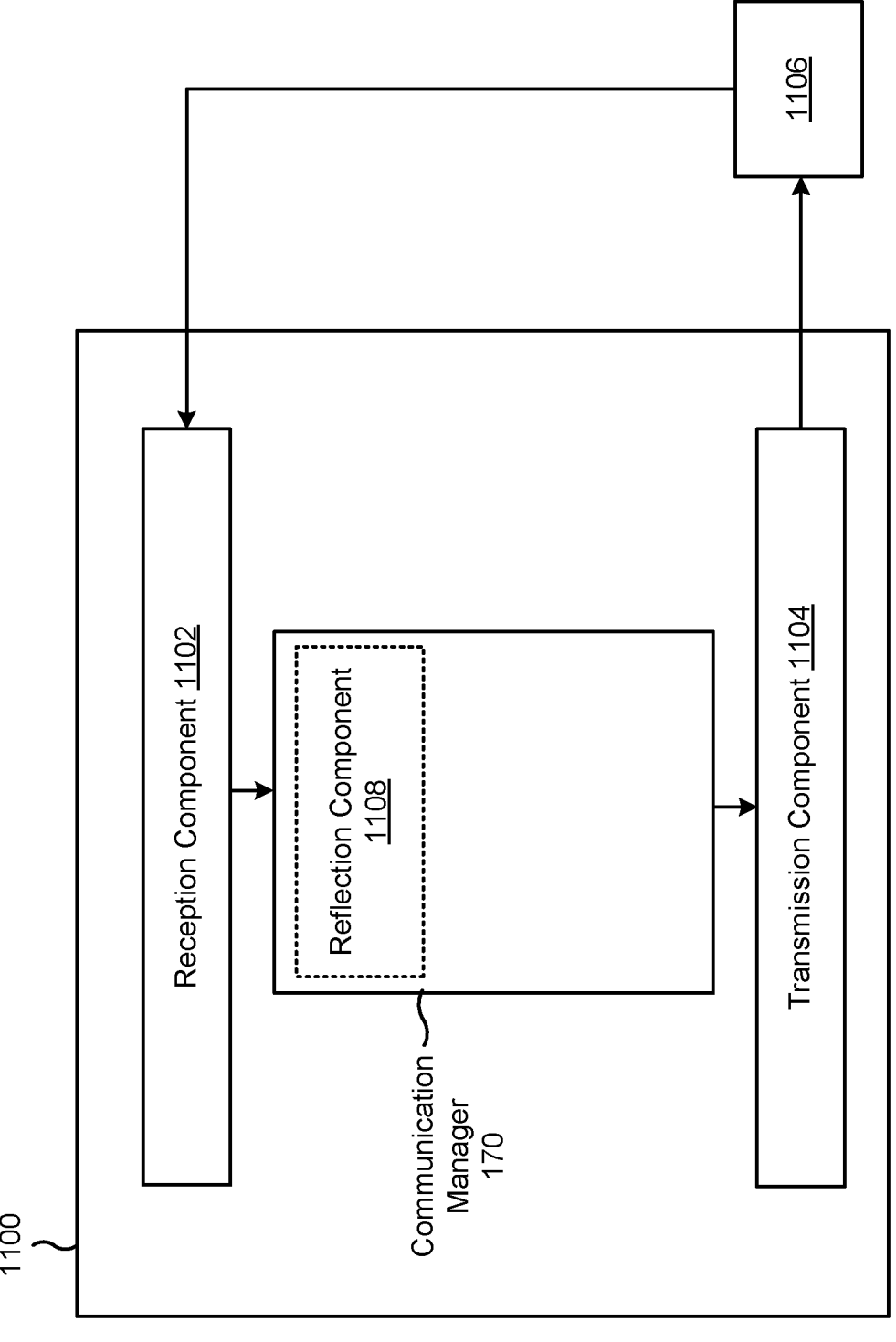

FIG. 11 is a diagram of an example apparatus 1100 for wireless communication. The apparatus 1100 may be a passive device (e.g., passive device 350, RIS 410, RIS 420), or a passive device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 170. The communication manager 170 may include a reflection component 1108, among other examples.

In some aspects, the apparatus 1100 may be configured to perform one or more operations described herein in connection with FIGS. 1-6. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the passive device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Although the apparatus 1100 is configured for passive reflection of signals, in some aspects, there may be some communication with another apparatus, such as a base station that provides control signals to the apparatus 1100. The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the passive device described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the passive device described in connection with FIG. 2. In some aspects, the transmission component 1104 may be co-located with the reception component 1102 in a transceiver.

The reflection component 1108 may reflect, with a first reflection configuration, an RS from a second device to a first device. The reflection component 1108 may refrain from reflecting one or more other RSs from the second device to the first device. The reflection component 1108 may change the first reflection configuration to a second reflection configuration based on information to be conveyed to the first device. The reflection component 1108 may reflect, with the second reflection configuration an additional RS from the second device to the first device.

The reception component 1102 may receive a control signal for operating the passive device, where a change between the first reflection configuration and the second reflection configuration indicates an acknowledgement of the control signal. The reception component 1102 may receive a control signal for operating the passive device, where a change between the first reflection configuration and the second reflection configuration indicates a negative acknowledgement.

The reception component 1102 may receive a scheduling configuration, where the reflecting of the RS, the refraining, and the reflecting of the additional RS are based on the scheduling configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
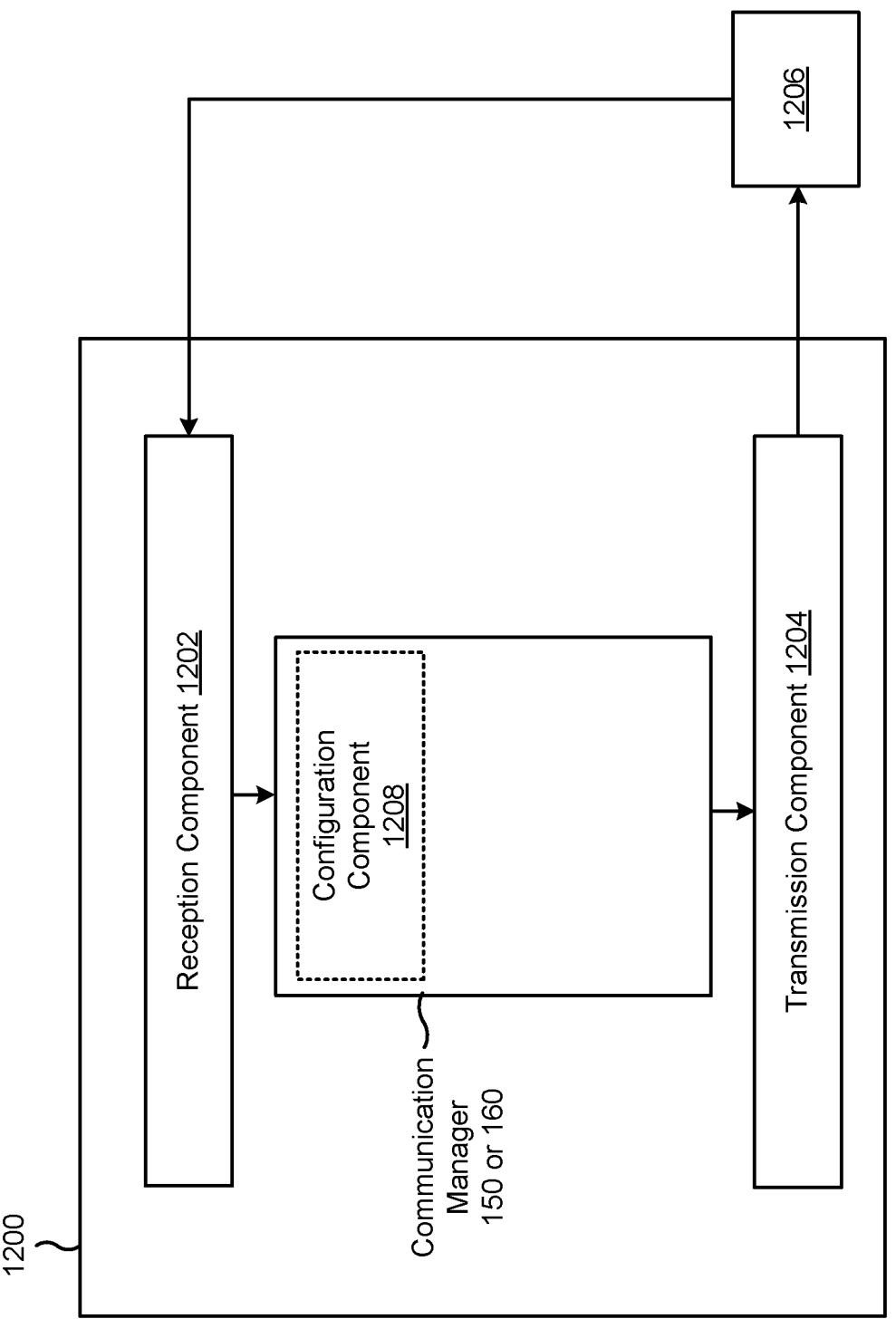

FIG. 12 is a diagram of an example apparatus 1200 for wireless communication. The apparatus 1200 may be a second device, or a second device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150 or the communication manager 160. The communication manager 150 or the communication manager 160 may include a configuration component 1208, among other examples.

In some aspects, the apparatus 1200 may be configured to perform one or more operations described herein in connection with FIGS. 1-6. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the second device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the second device described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/ processor, a memory, or a combination thereof, of the second device described in connection with FIG. 2. In some aspects, the transmission component 1204 may be co-located with the reception component 1202 in a transceiver.

The configuration component 1208 may schedule RS transmissions according to a received scheduling configuration. transmission component 1204 may transmit multiple RSs to a first device via a plurality of passive devices, where each RS of the multiple RSs is forwarded individually by one of the plurality of passive devices with a first set of reflection configurations. The transmission component 1204 may transmit an additional RS to the first device via the plurality of passive devices, where the additional RS is forwarded jointly by all of the plurality of passive devices with a second set of reflection configurations, and a change between the first set of reflection configurations and the second set of reflection configurations indicates information from the plurality of passive devices to the first device.

The reception component 1202 may receive a scheduling configuration, where the transmitting of the multiple RSs and the transmitting of the additional RS are based on the scheduling configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first device, comprising: receiving multiple reference signals (RSs) from a second device via a plurality of passive devices, wherein each RS of the multiple RSs is forwarded individually by one of the plurality of passive devices with a first set of reflection configurations; receiving an additional RS from the second device via the plurality of passive devices, wherein the additional RS is forwarded jointly by all of the plurality of passive devices with a second set of reflection configurations; and determining information from the plurality of passive devices based on the multiple RSs and the additional RS, wherein the information is represented by a change between the first set of reflection configurations and the second set of reflection configurations.

Aspect 2: The method of Aspect 1, further comprising transmitting an update message to at least one of the plurality of passive devices based on the information.

Aspect 3: The method of Aspect 1 or 2, further comprising transmitting a control signal to at least one passive device of the plurality of passive devices for operating the at least one passive device, and wherein the information is feedback for the control signal.

Aspect 4: The method of any of Aspects 1-3, further comprising transmitting the information to the second device.

Aspect 5: The method of any of Aspects 1-4, wherein the information includes a first portion corresponding to a change between a first reflection configuration and a second reflection configuration for a first passive device of the plurality of passive devices and a second portion corresponding to a change between a first reflection configuration and a second reflection configuration for a second passive device of the plurality of passive devices, and wherein determining the information includes: performing first channel estimation on a first RS of the multiple RSs for the first passive device; performing second channel estimation on a second RS of the multiple RSs for the second passive device; performing third channel estimation on the additional RS; and decoding the first portion of the information and the second portion of the information based on the first channel estimation, the second channel estimation, and the third channel estimation.

Aspect 6: The method of Aspect 5, wherein the change between the first reflection configuration and the second reflection configuration for the first passive device indicates an acknowledgement.

Aspect 7: The method of Aspect 5, wherein the change between the first reflection configuration and the second reflection configuration for the first passive device indicates a negative acknowledgement.

Aspect 8: The method of any of Aspects 5-7, wherein decoding the first portion and the second portion includes testing hypotheses for candidate changes between the first reflection configuration and the second reflection configuration for the first passive device and for candidate changes between the first reflection configuration and the second reflection configuration for the second passive device.

Aspect 9: The method of Aspect 8, wherein decoding the first reflection configuration and the second reflection configuration includes using sphere decoding to limit a quantity of the hypotheses to be tested.

Aspect 10: The method of any of Aspects 1-9, wherein the receiving of the multiple RSs and the receiving of the additional RS are based on a scheduling configuration.

Aspect 11: The method of Aspect 10, further comprising transmitting the scheduling configuration to one or more of the second device or the plurality of passive devices.

Aspect 12: A method of wireless communication performed by a passive device, comprising: reflecting, with a first reflection configuration, a reference signal (RS) from a second device to a first device; refraining from reflecting one or more other RSs from the second device to the first device; changing the first reflection configuration to a second reflection configuration based on information to be conveyed to the first device; and reflecting, with the second reflection configuration an additional RS from the second device to the first device.

Aspect 13: The method of Aspect 12, wherein the passive device is configured to operate as a reconfigurable intelligent surface.

Aspect 14: The method of Aspect 12 or 13, further comprising receiving a control signal for operating the passive device, wherein a change between the first reflection configuration and the second reflection configuration indicates an acknowledgement of the control signal.

Aspect 15: The method of Aspect 12 or 13, further comprising receiving a control signal for operating the passive device, wherein a change between the first reflection configuration and the second reflection configuration indicates a negative acknowledgement.

Aspect 16: The method of any of Aspects 12-15, further comprising receiving a scheduling configuration, wherein the reflecting of the RS, the refraining, and the reflecting of the additional RS are based on the scheduling configuration.

Aspect 17: A method of wireless communication performed by a second device, comprising: transmitting multiple reference signals (RSs) to a first device via a plurality of passive devices, wherein each RS of the multiple RSs is forwarded individually by one of the plurality of passive devices with a first set of reflection configurations; and transmitting an additional RS to the first device via the plurality of passive devices, wherein the additional RS is forwarded jointly by all of the plurality of passive devices with a second set of reflection configurations, wherein a change between the first set of reflection configurations and the second set of reflection configurations indicates information from the plurality of passive devices to the first device.

Aspect 18: The method of Aspect 17, further comprising receiving a scheduling configuration, wherein the transmitting of the multiple RSs and the transmitting of the additional RS are based on the scheduling configuration.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
one or more memories; and
one or more processors, coupled to the one or more memories, configured to:
determine a first channel estimation from a first reference signal (RS) received from a second device via a first passive device of a plurality of passive devices;
determine a second channel estimation from a second RS received from the second device via a second passive device of the plurality of passive devices:

determine a third channel estimation from a third RS received from the second device via both the first passive device and the second passive device; and determine information respective to the first passive device and the second passive device, wherein the information respective to the first passive device is represented by a change between the first channel estimation and the third channel estimation and the information respective to the second passive device is represented by a change between the second channel estimation and the third channel estimation.

2. The first device of claim 1, wherein the one or more processors are configured to transmit an update message to at least one of the plurality of passive devices based on the information.

3. The first device of claim 1, wherein the one or more processors are configured to transmit a control signal to at least one passive device of the plurality of passive devices for operating the at least one passive device, and wherein the information is feedback for the control signal.

4. The first device of claim 1, wherein the one or more processors are configured to transmit the information to the second device.

5. The first device of claim 1, wherein the information includes a first portion corresponding to a change between a first reflection configuration and a second reflection configuration for the first passive device of the plurality of passive devices and a second portion corresponding to a change between a first reflection configuration and a second reflection configuration for the second passive device of the plurality of passive devices.

6. The first device of claim 5, wherein the change between the first reflection configuration and the second reflection configuration for the first passive device indicates an acknowledgement.

7. The first device of claim 5, wherein the change between the first reflection configuration and the second reflection configuration for the first passive device indicates a negative acknowledgement.

8. The first device of claim 5, wherein the one or more processors are configured to test hypotheses for candidate changes between the first reflection configuration and the second reflection configuration for the first passive device and for candidate changes between the first reflection configuration and the second reflection configuration for the second passive device.

9. The first device of claim 8, wherein the one or more processors are configured to use sphere decoding to limit a quantity of the hypotheses to be tested.

10. The first device of claim 1, wherein the one or more processors are configured to receive the first RS, the second RS, and the third RS based on a scheduling configuration.

11. The first device of claim 10, wherein the one or more processors are configured to transmit the scheduling configuration to one or more of the second device or the plurality of passive devices.

12. A method of wireless communication performed by a first device, comprising:

determining a first channel estimation from a first reference signal (RS) received from a second device via a first passive device of a plurality of passive devices;

determining a second channel estimation from a second RS received from the second device via a second passive device of the plurality of passive devices;

determining a third channel estimation from a third RS received from the second device via both the first passive device and the second passive device; and determining information respective to the first passive device and the second passive device, wherein the information respective to the first passive device is represented by a change between the first channel estimation and the third channel estimation and the information respective to the second passive device is represented by a change between the second channel estimation and the third channel estimation.

13. The method of claim 12, further comprising transmitting an update message to at least one of the plurality of passive devices based on the information.

14. The method of claim 12, further comprising transmitting a control signal to at least one passive device of the plurality of passive devices for operating the at least one passive device, and wherein the information is feedback for the control signal.

15. The method of claim 12, further comprising transmitting the information to the second device.

16. The method of claim 12, wherein the information includes a first portion corresponding to a change between a first reflection configuration and a second reflection configuration for the first passive device of the plurality of passive devices and a second portion corresponding to a change between a first reflection configuration and a second reflection configuration for the second passive device of the plurality of passive devices.

17. The method of claim 16, wherein the change between the first reflection configuration and the second reflection configuration for the first passive device indicates an acknowledgement.

18. The method of claim 16, wherein the change between the first reflection configuration and the second reflection configuration for the first passive device indicates a negative acknowledgement.

19. The method of claim 16, further comprising:

testing hypotheses for candidate changes between the first reflection configuration and the second reflection configuration for the first passive device and for candidate changes between the first reflection configuration and the second reflection configuration for the second passive device.

20. The method of claim 19, further comprising:

using sphere decoding to limit a quantity of the hypotheses to be tested.

21. The method of claim 12, wherein the receiving of the first RS, the second RS, and the third RS are based on a scheduling configuration.

22. The method of claim 21, further comprising transmitting the scheduling configuration to one or more of the second device or the plurality of passive devices.

23. A first device for wireless communication, comprising:

means for determining a first channel estimation from a first reference signal (RS) received from a second device via a first passive device of a plurality of passive devices;

means for determining a second channel estimation from a second RS received from the second device via a second passive device of the plurality of passive devices;

means for determining a third channel estimation from a third RS received from the second device via both the first passive device and the second passive device; and means for determining information respective to the first passive device and the second passive device, wherein the information respective to the first passive device is represented by a change between the first channel estimation and the third channel estimation and the information respective to the second passive device is represented by a change between the second channel estimation and the third channel estimation.

24. The first device of claim 23, comprising:

means for transmitting an update message to at least one of the plurality of passive devices based on the information.

25. The first device of claim 23, comprising:

means for transmitting a control signal to at least one passive device of the plurality of passive devices for operating the at least one passive device, and wherein the information is feedback for the control signal.

26. The first device of claim 23, wherein the information includes a first portion corresponding to a change between a first reflection configuration and a second reflection configuration for the first passive device of the plurality of passive devices and a second portion corresponding to a change between a first reflection configuration and a second reflection configuration for the second passive device of the plurality of passive devices.

27. A non-transitory computer-readable medium storing a set of instructions for wireless communication, the set of instructions comprising:

one or more instructions that, when executed by one or more processors of a first device, cause the first device to:

determine a first channel estimation from a first reference signal (RS) received from a second device via a first passive device of a plurality of passive devices;

determine a second channel estimation from a second RS received from the second device via a second passive device of the plurality of passive devices;

determine a third channel estimation from a third RS received from the second device via both the first passive device and the second passive device; and determine information respective to the first passive device and the second passive device, wherein the information respective to the first passive device is represented by a change between the first channel estimation and the third channel estimation and the information respective to the second passive device is represented by a change between the second channel estimation and the third channel estimation.

28. The non-transitory computer-readable medium of claim 27, wherein the one or more instructions when executed by the one or more processors, cause the first device to:

transmit an update message to at least one of the plurality of passive devices based on the information.

29. The non-transitory computer-readable medium of claim 27, wherein the one or more instructions when executed by the one or more processors, cause the first device to:

transmit a control signal to at least one passive device of the plurality of passive devices for operating the at least one passive device, and wherein the information is feedback for the control signal.

* * * * *